June 7, 1955  D. E. BAYNE  2,710,389
AERONAUTICAL NAVIGATION AIDS
Filed June 9, 1953  2 Sheets-Sheet 1

INVENTOR.
DONALD E. BAYNE
BY
ATTORNEY

June 7, 1955 D. E. BAYNE 2,710,389
AERONAUTICAL NAVIGATION AIDS
Filed June 9, 1953 2 Sheets-Sheet 2

INVENTOR.
DONALD E. BAYNE
BY
[signature]
ATTORNEY

United States Patent Office 2,710,389
Patented June 7, 1955

2,710,389

AERONAUTICAL NAVIGATION AIDS

Donald E. Bayne, North Muskegon, Mich.

Application June 9, 1953, Serial No. 360,481

5 Claims. (Cl. 340—27)

This invention relates to a mechanism designed to aid in the execution of a proper approach in landing of aircraft. Particularly it relates to a mechanism designed to produce a combination of audible and visual signals to indicate whether the craft is approaching at the correct air speed and capable of varying its signal when the approach is either too fast or too slow. It serves the further function of indicating the safe stalling altitude of the craft during the correct approach.

In the navigation of aircraft, one of the most difficult maneuvers to master is the proper approach and landing of the craft. To execute a proper landing, it is necessary that the proper glide angle be maintained within a narrowly limited speed range. The pilot must also know when he is close enough to the runway that he may stall the plane to complete the landing and make ground contact.

In most civilian aircraft the total, effective, airfoil area remains fixed. Therefore, in order to cause a plane to lose altitude there are only two factors which may be changed by the pilot, these being the speed and the angle of attack of the airfoil. Both are used in effecting a landing. However, to produce a good landing, a certain ratio between the angle of attack and the speed must be maintained, if the plane is to be landed safely without shock and within a reasonable length of runway. If the plane is brought down by nosing the plane into a shallow dive, while maintaining an excessive airspeed, the plane will plunge into the ground unless its angle of attack is changed just before it touches the runway. If the speed is too high at this point, the plane will not settle upon the runway because its speed will create too much lift. If the plane's airspeed is too slow, its loss of altitude will be so rapid that it will either not be able to reach the end of the runway or it will be substantially impossible for the pilot to maneuver it during the latter part of its glide. The danger of a premature stall is greatly increased.

Learning to maintain a balance between these factors is particularly difficult for student pilots. It is sometimes difficult for seasoned pilots where there is excessive ground wind or the aircraft is unfamiliar or the landing is being made at an unknown airstrip. These factors are greatly magnified in night flying and on water for seaplanes day or night.

It is the object of my invention to provide an instrument which will, as soon as the glide is initiated, by a combination of signals, inform the pilot if his approach airspeed is correct. It will provide a different combination of signals if the speed of approach is too slow and a still different combination of signals if the speed of approach is too fast. It also produces a signal indicating that it is safe to stall the craft providing the correct glide speed is maintained. Further, it is so designed that most of this information is transmitted to the pilot by means of audible signals, eliminating the necessity for visual inspection of an instrument panel. It is an additional object of my invention to provide such an instrument of sufficiently simple and light weight design that it is adapted to use on small, light, civilian aircraft.

These and other objects and purposes of my invention will be readily understood by those acquainted with the design of aeronautical equipment upon reading the following specification and the accompanying drawings.

In executing the objects and purposes of my invention, I have provided an instrument consisting of a flexible actuator rod normally held in retracted position either in or substantially flat against the body of the aircraft. By suitable means, the pilot may cause the rod to be extended, that is, pivoted down to cause its lower end to extend below the aircraft. When extended, the rod's exact position is determined by a balance between the force exerted by a spring pulling the rod into further extended position and the airstream drag created by the aircraft's speed.

If the approach speed is correct, these forces will be balanced and the rod will cause actuation of a low pitch buzzer and a signal light. If the approach is too slow, the spring will dominate pulling the rod into further extended position, turning off the low pitch buzzer and actuating a high pitch buzzer. The signal light will remain on. If the speed of approach is excessive, the airstream drag will dominate, causing the rod to retract partially, turning off the light and causing the high and low pitch buzzers to be actuated simultaneously. Thus, the pilot, by variations in the instrument's audible signals will be kept informed of airspeed of the ship and instructed as to the type of corrections which must be made.

When the aircraft is two to four feet above the runway, the flexible actuator rod will contact the runway and be caused to retract. This will immediately inactivate both buzzers and the light. When this occurs, the pilot knows that he is so close to the runway that it is safe to stall the plane and complete his landing. Upon landing, the flexible actuator rod will be fully retracted by an over-center spring arrangement.

In the following description the terms "fore" and "aft" are frequently used and are to be taken to mean "fore" toward the nose of the aircraft and "aft" toward the empennage of the aircraft.

Figure 3:
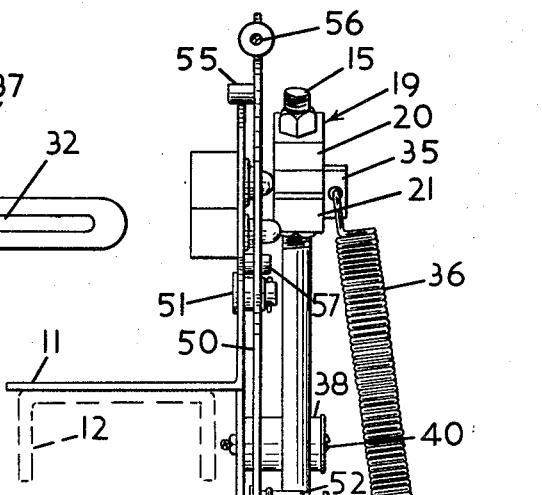
Fig. 3 is an end elevation view of my invention.

Referring to the drawings in detail, my invention is mounted by means of a plate 10, having a pair of laterally projecting flanges 11 (Fig. 3). By means of the flanges 11, the plate may be securely anchored to some structural member 12 of the aircraft on which it is to be used. The plate 10 is designed to be oriented parallel to the fore and aft axis of the aircraft whereby the hereinafter described rod moves in the same plane.

Figure 2:
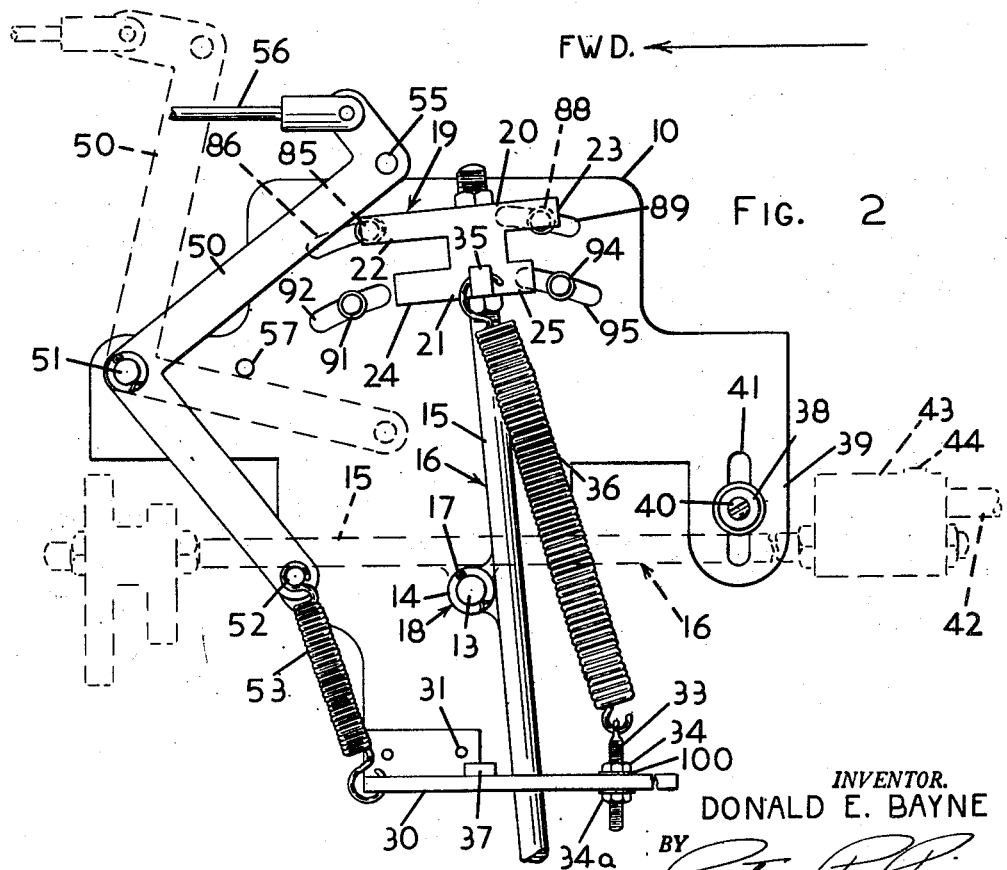
Fig. 2 is a side elevation view of my invention showing the actuator rod in extended or operating position and, in phantom, showing it in retracted position.

A pin 13 is rigidly affixed to the lower central portion of the plate 10 (Fig. 2). The pin 13 rotatably mounts a sleeve bearing 14 which in turn is rigidly secured to the upper portion 15 of the flexible actuator rod 16. The bearing 14 is prevented from disengaging the pin 13 by means of the cotter pin 17. The pin and bearing together form the main pivot 18 of the instrument.

A somewhat H-shaped head 19 is rigidly secured to the upper end of the actuator rod 15. The head 19 has an upper arm 20 and a lower arm 21. The upper arm 20 has a forward portion 22 and a rearward portion 23, the forward portion 22 being substantially longer than the rearward portion 23. The lower arm 21 also has a forward portion 24 and a rearward portion 25 with the forward portion 24 being longer than the rearward portion 25. The upper and lower arms are spaced longitudinally of the actuator rod 15 for reasons which will appear more fully hereinafter.

Figure 4:
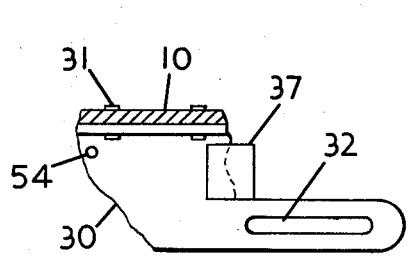
Fig. 4 is a sectional view taken along the plane IV—IV of Fig. 3 showing only the mounting structure for the instrument.

A rearwardly projecting leg 30 is secured to the bottom of the plate 10 by the rivets 31 (Figs. 2, 3 and 4). An elongated slot 32 (Fig. 4) is provided in the rearward portion of the leg 30. The slot 32 is aligned parallel to the fore and aft axis of the aircraft. A stud 33, having a loop on one end is mounted through this slot and secured by nuts 34 and 34a, one on each side of leg 30. Lock washers 100 are used with the nuts 34 and 34a. The circumstances dictating the particular positioning of stud 33 will be described under "Operation."

The head 19 is provided with an apertured ear 35. The ear 35 and the stud 33 are connected by a spring 36. Irrespective of the position of stud 33, the lower end of the spring 36 will always be rearward of the main pivot 18. Thus, when the actuator rod 16 is in extended position (the position shown in full lines in Fig. 2) the centerline of the spring is aft of the main pivot 18 and the spring 36 will pull the actuator rod further into extended position. At the same time, when the actuator rod 16 is in retracted position (the position shown in phantom lines in Fig. 2) the centerline of the spring 36 will be forward of the main pivot 18 and the spring 36 will urge the actuator rod further into retracted position. This is an important characteristic of my invention and will be described in detail in the section entitled "Operation."

Figure 1:
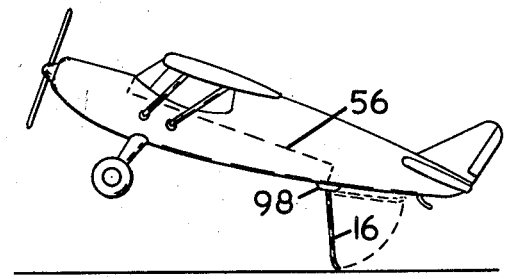
Fig. 1 is a side elevation view of an airplane equipped with my invention.

A rubber stop 37 is mounted on the leg 30 in such a position that it will not contact the actuator rod 16 until the rod has passed substantially beyond its normal, extended position (Figs. 1, 3 and 4).

Retractive or upward movement of the lower end of the actuator rod 16 is limited by a resiliently surfaced stop 38. The stop is secured to an ear 39 at the rearward end of the plate 10 by means of a screw and nut combination 40. The vertical position of the stop 38 may be adjusted since the screw 40 passes through a vertically oriented slot 41. Vertical adjustment is provided so that the proper position of the rod may be attained for full retraction irrespective of the design of the particular aircraft to which my invention is applied.

The detachable portion 42 of the actuator rod 16 consists of a flexible shaft, the length of which will be dependent upon the particular aircraft to which the instrument is applied. Normally, this rod will be four to five feet in length. The upper and detachable portions of the actuator rod 16 are joined by the coupler 43, the detachable portion 42 being removably held by means of the set screw 44. By dividing the rod 16 into two sections, the instrument may be quickly and economically adjusted to the characteristics of the particular make of aircraft to which it is applied without the necessity of modifying the main portion of the instrument.

The detachable portion 42 is made flexible to prevent injury when ground contact is made. The flexibility also serves to remove any ice and mud which may accumulate on the rod.

The actuator rod 16 is moved from retracted to extended position by means of the bell crank 50. The bell crank 50 is pivotally mounted at its apex on the pin 51. At its lower end, a pin 52 extends through the bell crank. The inner end of the pin 52 contacts the actuator rod 16 and the outer end provides an anchor for the upper end of the spring 53. The lower end of the spring 53 is secured to the leg 30 by passing the end through the aperture 54 (Fig. 4). The crank 50 has a stop 55 adjacent its upper end. The stop 55, by contact with the top of the plate 10, limits the downward or rearward movement of the crank. A cable 56 is secured to the upper end of the crank. The cable 56 extends to the pilot's compartment. At the pilot's compartment, a suitable handle is secured to the cable 56 whereby upon a pull being exerted on the handle, the bell crank will be pivoted forwardly, moving the actuator rod 16 into extended position. The spring 53 will automatically return the crank 50 and the cable 56 to their original positions upon release of the handle. Upward or forward movement of the crank 50 is limited by the stop 57. It is unnecessary that the lower end of the crank travel the full distance of extending movement of the actuator rod 16 since as soon as the centerline of the spring 36 passes rearwardly of the main pivot 18, the spring 36 will take over and complete the extending movement of the actuator rod 16.

It will be recognized that the cable 56 may be replaced by solenoid for actuating the crank 50. This is particularly true in the case of larger aircraft.

Figure 5:
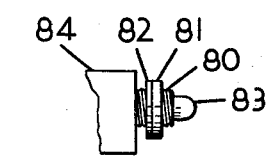
Fig. 5 is a fragmentary view of a typical switch used in my invention.

A plurality of switches are mounted on the plate 10. Two of the switches are so mounted that they are activated by the upper portion 20 of the head 19. Two additional switches are so mounted that they are activated by the lower portion 21 of the head 19. Although switches of any suitable construction may be used, microswitches are considered preferable. The switches each have an externally threaded collar 80 projecting from one end, cooperating with an internally threaded ring 81 (Fig. 5). The switch is secured to the plate 10 by tightening the ring 81 to press the lock washer 82 against one face of the plate, pulling the body of the switch against the other face of the plate. Each of the switches has a depressible plunger 83 extending through the threaded collar for cooperation with the head 19.

Figure 6:
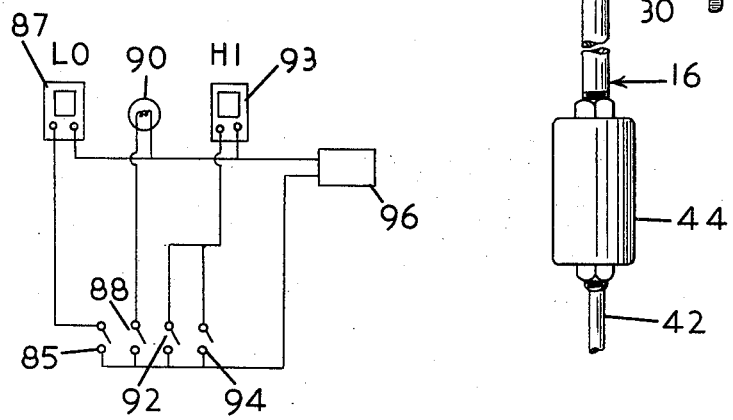
Fig. 6 is a diagrammatic presentation of the electrical circuit for my invention.

The upper forward switch 85 is so mounted that it is actuated by the forward portion of the upper arm 20 of the head 19. It is mounted through the plate by means of the slot 86 whereby it may be adjusted in a forwardly and rearwardly direction. The upper forward switch controls the operation of the low pitch buzzer 87 (Fig. 6).

The upper rearward switch 88 is so mounted that it is actuated by the rearward portion 23 of the upper arm 20 of the head 19. It is also mounted in a slot 89 in the plate 10. The switch 88 controls the operation of the light 90.

The lower forward switch 91 is so located that it is actuated by the forward portion 24 of the lower arm 21 of the head 19. It is also mounted in a slot 92 in the plate 10. The switch 91, together with the hereinafter described switch 94, controls the operation of the high pitch buzzer 93.

The lower rearward switch 94 is so located that it is actuated by the rearward portion 25 of the lower arm 21 of the head 19. It is mounted through the plate 10 by means of the slot 95. The switch 94, together with the switch 91, regulate the operation of the high pitch buzzer 93. These switches are mounted in parallel permitting each switch to separately regulate the buzzer's operation.

Electrical energy to operate the buzzers 87 and 93 and the light 90 is provided from any suitable source 96. This source may be either a battery or a generator depending upon the equipment available in the particular plane to which my invention is attached.

The various components of my invention where they do not constitute bearings, are made from any suitable material preferably aluminum or magnesium where possible, because of their light weight. The various bearing portions of my invention are preferably made from bronze or other suitable bearing material. The lower portion of the mechanism when mounted in a plane, normally projects below the body of the plane and is enclosed by a metallic or plastic shell 98 (Fig. 1) to reduce wind resistance and protect the mechanism against inclement weather and possible injury.

Operation

My invention is designed to be applicable to many different types and makes of aircraft having various structural and flight characteristics. In order to be applicable to these various makes of aircraft, the instrument must necessarily be made adjustable to meet the circumstances involved. These adjustable features will be described along with the operation of the instrument.

The location of the instrument on the aircraft will depend upon the type of landing gear with which the aircraft is equipped. If the aircraft has a two wheel landing gear and a tail wheel or skid (as shown in Fig. 1), the instrument will be mounted toward the rear of the plane somewhat forward of the tail skid. If the plane is equipped with tricycle landing gear, the instrument will be located substantially forward at a point just rear of the main landing gear.

After the instrument has been mounted to the plane structure by securing the flanges 11 to the structure 12 of the aircraft, the instrument is adjusted to the particular flight characteristics of the aircraft involved. The first adjustment is the location of the stud 33 in slot 32 together with the vertical adjustment of the stud by means of the nuts 34 and 34a which will provide the spring 36 with sufficient tension to hold the actuator rod 16 substantially erect but with a half to three-quarters of an inch clearance from the stop 37 when the aircraft is moving in a glide at the correct speed for proper landing. This means that the tension of the spring must be sufficient to overcome the drag imposed by the airstream with the spring tending to pull the actuator rod into complete extension and the drag tending to move the rod into retracted position. When this balance has been attained, the switches 85, 88, 91 and 94 are adjusted in their respective slots to produce the desired signals.

The switch 85, controlling the low pitch buzzer 87, is adjusted to a position where the head 19 holds the switch depressed and the buzzer on but when the rod 16 has traveled to the limit of its extension and contacts the bumper 37, the head will have passed beyond the switch 85, releasing it and silencing the buzzer.

At the same time, the switch 88 controlling the operation of the light 90, is adjusted in a fore and aft direction so that it also is depressed by the head 19 when the rod 16 is in its balanced position and while the switch 85 is depressed to operate the low pitch buzzer 87.

The switches 91 and 94, controlling the high pitch buzzer, are adjusted so that neither switch is contacted by the head 19 when the rod 16 is in its balanced position. The switch 94 is so positioned that it will be contacted and depressed by the rod to operate the high pitch buzzer when the upper forward portion 22 of the head 19 releases the switch 85 controlling the low pitch buzzer due to rearward movement of the head. The switch 91, also controlling the high pitch buzzer, is so located that it will be contacted by the head 19 and caused to operate the high pitch buzzer when the head moves forward sufficiently to release the switch 88 turning off the light 90. This arrangement produces the combination of signals necessary for the instrument to transmit a complete picture of the plane's flight behavior to the pilot. The head 19 and all of the switches are so arranged that when ground contact is made, the head will move beyond all of the switches, turning off the light and both buzzers.

Assuming the actuator rod 16 to be in retracted position, the pilot pulls the cable 56 as soon as he starts or is about to start his glide in preparation for landing. This pivots the crank 50 upwardly and forwardly, causing the actuator rod 16 to move from retracted to extended position. As soon as the actuator rod 16 is extended, the pilot releases the cable 56 and the spring 53 returns the crank 50 to its original position, retracting the cable 56. The cable 56 is led to the pilot's compartment by any suitable combination of pulleys and fairleads conventionally used on aircraft.

The signal combinations that will be produced by the instrument appear in the following chart:

| Airspeed | Signal | | | No. |
| --- | --- | --- | --- | --- |
| | Low Pitch Buzzer | High Pitch Buzzer | Light | |
| Correct | On | Off | On | 1 |
| Too Slow | Off | On | On | 2 |
| Too Fast | On | On | Off | 3 |
| Safe To Stall [1] | Off | Off | Off | 4 |

[1] If immediately preceding signal was No. 1.

It will be seen from the chart that if the aircraft is approaching at the correct speed, the extended actuator rod 16 will turn on the low pitch buzzer and signal light. If the speed of glide is too slow, the high pitch buzzer and the light will be on but the low pitch buzzer will be off. The actuation of the high pitch buzzer warns the pilot immediately that he is going too slow. As soon as he corrects his speed, the high pitch buzzer will go off and the low pitch buzzer will come on.

If his speed is too high, both the low and high pitch buzzers will come on and the light will go off. Again, correction of the aircraft's speed will cause the high pitch buzzer to go off and the signal light to come on. The instrument will create these signals so long as the actuator rod is extended. If, during approach to the airstrip, the speed of the aircraft changes, this change will be immediately reflected in the signals produced by the instrument. Observation of the chart shows that the information necessary to correct the speed of the plane may be obtained by the pilot from the instrument without visual inspection of an instrument panel since the combination of buzzer signals alone are sufficient to transmit the necessary information. The primary purpose of the light is to provide a visual signal when desired and to indicate to the pilot whether the instrument is functioning properly.

When the plane has reached the point that the actuator rod 16 contacts the runway surface and is forced back, it will immediately turn off both buzzers and the light. This automatically tells the pilot that it is safe to stall the plane and complete the landing, if, at the time the signals are silenced, only the low pitch buzzer and the light were operating. When the actuator rod will contact the runway will depend upon the rod's length. The length of the rod will vary from one model and make of plane to another. It is for this purpose that the rod is made in two sections with the lower or flexible section 42 made detachable from the upper section so that only the lower portion 42 need be changed to adapt the instrument from one make and model of plane to another. The stop 38 which limits the retractive movement of the actuator rod 16, is made vertically adjustable by the slot 41 so that the rod, when retracted, will lie immediately adjacent the plane's surface irrespective of the particular shape of the fuselage of the plane to which it is applied.

It will be seen that my invention provides a continuous source of valuable information to the pilot throughout the landing maneouver. It is of particular aid to the student pilot or to veteran pilots who are approaching an airstrip with which they are not familiar and for night flying where visibility is limited. It also aids in water landings where visibility always is deceiving. The instrument is both light weight and simple in design. Thus, it is fitted to the requirements of small, civilian aircraft. At the same time, it may be applied to much larger aircraft if desired. The instrument is capable of providing a great deal more information than any other instrument of its type heretofore developed and to provide this information by means of audible signals whereby the pilot's visual attention need not be removed from the runway he is approaching.

It will be recognized that various modifications of my invention may be made, each without departing from the principle thereof. Each of these modifications is to be considered as included in the hereinafter appended claims unless these claims by their language expressly state otherwise.

I claim:

1. An aeronautical navigation instrument comprising: a mounting plate adapted to be secured to the frame of an aircraft; a plurality of spaced switches mounted on said plate; a flexible rod and means for pivotally mounting said rod adjacent its upper end to said plate; head means on the upper end of said rod for individually operating each of said switches; signal means connected to each of said switches; the lower end of said rod extending substantially beyond the exterior surface of said aircraft; a spring for urging the lower end of said rod forwardly; means for adjusting the tension of said spring to equal the airstream drag on the lower end of said rod when said aircraft is approaching a landing at the correct airspeed.

2. In an instrument as described in claim 1 wherein said plurality of switches includes four switches, two forward of and two rearward of said rod when the airspeed of said aircraft is correct; one of said forward pair and one of said rearward pair of switches being closed by said head means when the airspeed of said aircraft is correct; the rearward pair of said switches being closed by said head means when the airspeed of said aircraft is too slow; the forward pair of said switches being closed by said head means when the airspeed of said aircraft is too fast.

3. In an instrument as described in claim 1 wherein said plurality of switches includes four switches, two forward of and two rearward of said rod when the airspeed of said aircraft is correct; one of said forward pair being connected to a low pitch buzzer; the other of said forward pair being connected to a high pitch buzzer; one of said rearward pair being connected to a light and the other of said rearward pair being connected to said high pitch buzzer; said one of said forward pair and said one of said rearward pair of switches being closed by said head means when the airspeed of said aircraft is correct; the rearward pair of said switches being closed by said head means when the airspeed of said aircraft is too slow; the forward pair of said switches being closed by said head means when the airspeed of said aircraft is too fast.

4. An aeronautical navigation instrument comprising: an actuator rod; means for pivotally mounting said rod adjacent its upper end to an aircraft whereby it may alternately assume extended and retracted positions; in extended position the lower portion of said rod depending from said aircraft below the landing gear of said aircraft; a head on the upper end of said rod; a spring having a stationary anchor on one end and means anchoring it to said head on the other end; the centerline of said spring being below said pivot means when said rod is retracted for urging said rod into retracted position; the centerline of said spring being rearward of said pivot means when said rod is extended for urging said rod into extended position; means for adjusting the tension of said spring to equal the airstream drag on said rod at a predetermined speed of said aircraft; a plurality of switches each individually operable by said head as said rod pivots; signal means connected with said switches.

5. An aeronautical navigation instrument comprising: an actuator rod; means for pivotally mounting said rod adjacent its upper end to an aircraft whereby it may alternately assume extended and retracted positions; a head on the upper end of said rod; a spring having a stationary anchor on one end and means anchoring it to said head on the other end; the centerline of said spring being below said pivot means when said rod is retracted for urging said rod into retracted position; the centerline of said spring being rearward of said pivot means when said rod is extended for urging said rod into extended position; means for adjusting the tension of said spring to equal the airstream drag on said rod at a predetermined speed of said aircraft; a plurality of switches each individually operable by said head as said rod pivots; signal means connected with said switches.

References Cited in the file of this patent

UNITED STATES PATENTS

| | | |
|---|---|---|
| 1,885,578 | Boybow | Nov. 1, 1932 |
| 1,976,587 | Teetor | Oct. 9, 1934 |
| 2,296,528 | Lacoe | Sept. 22, 1942 |
| 2,328,384 | Lacoe | Aug. 31, 1943 |
| 2,337,753 | Lacoe | Dec. 28, 1943 |